United States Patent Office 3,318,348
Patented May 9, 1967

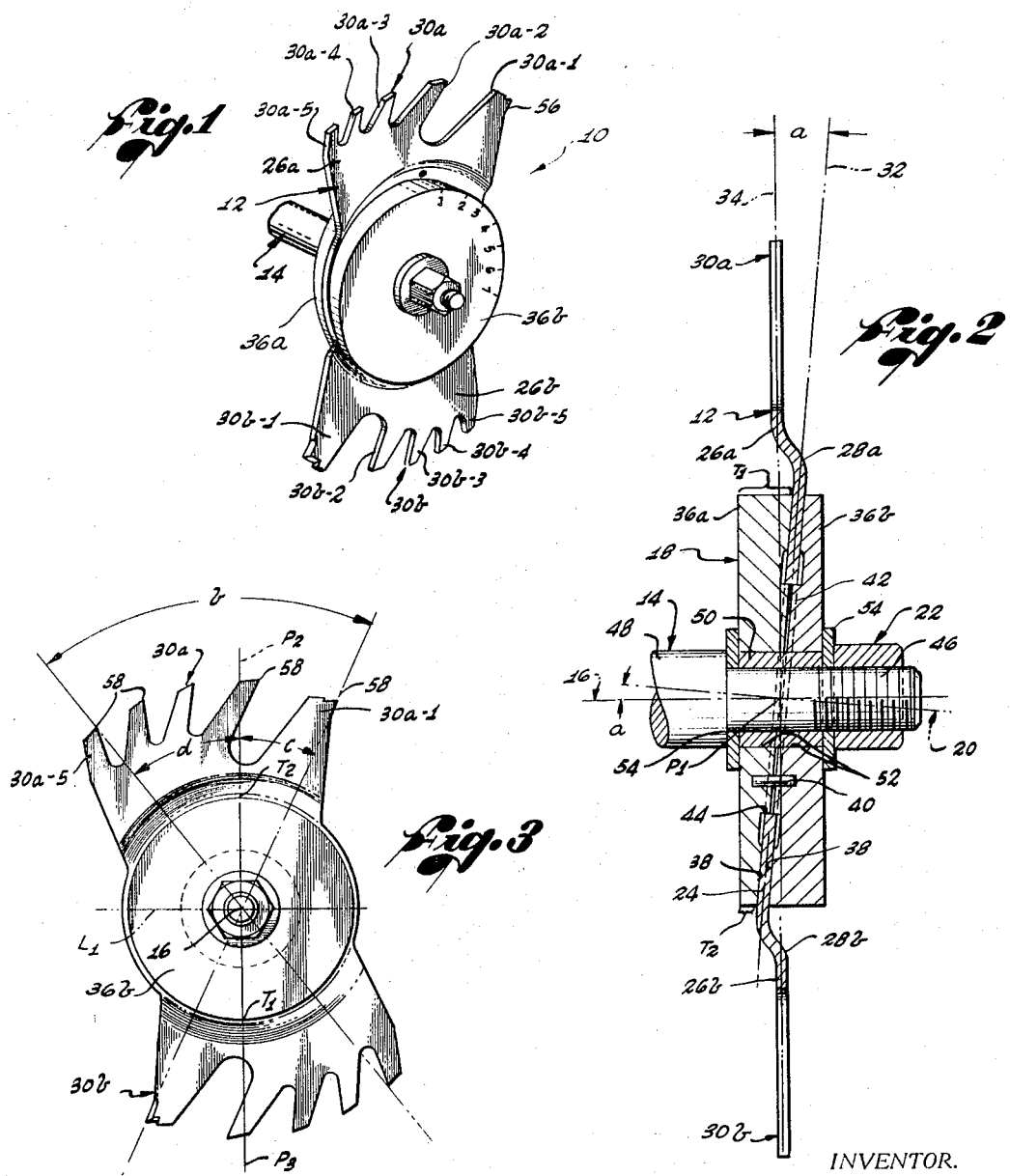

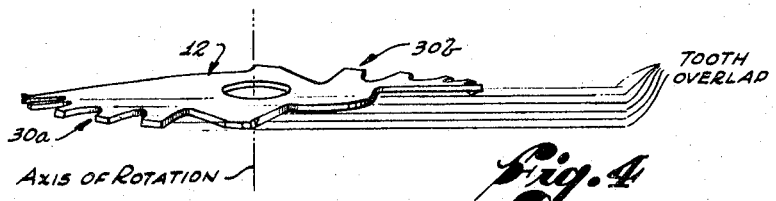
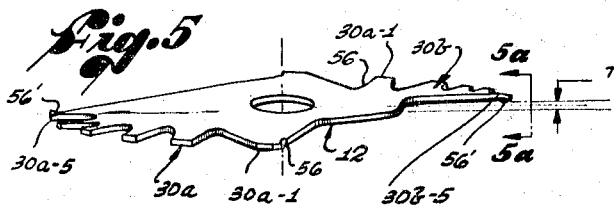
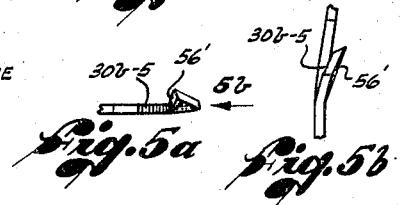
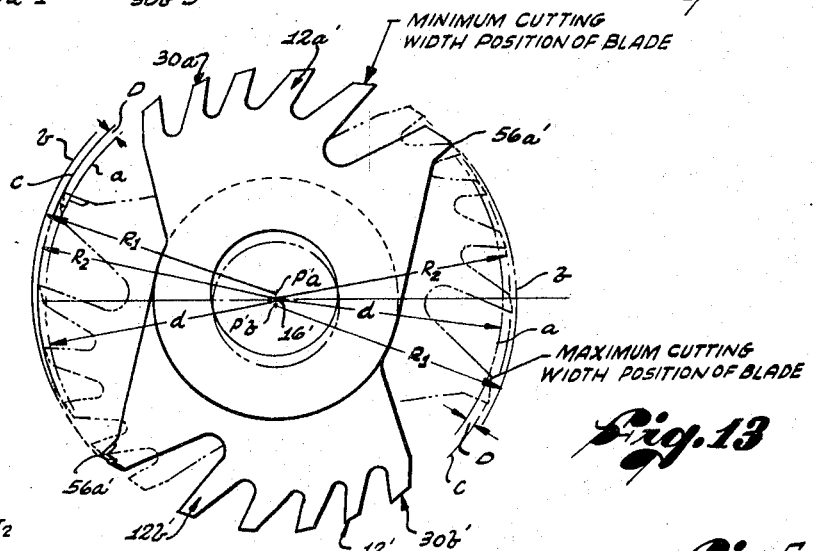
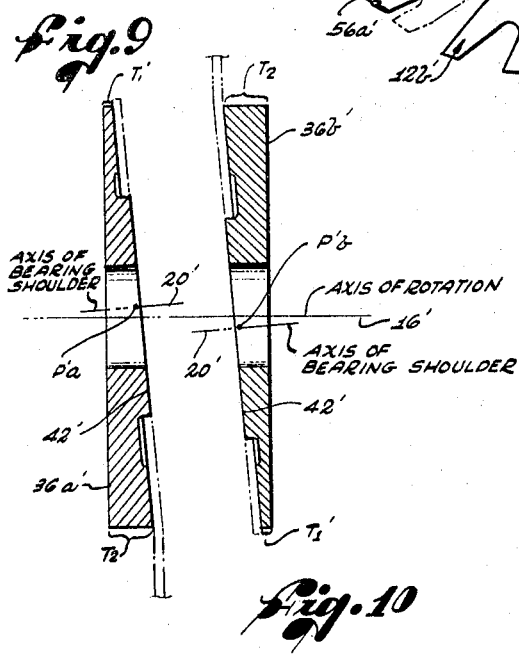

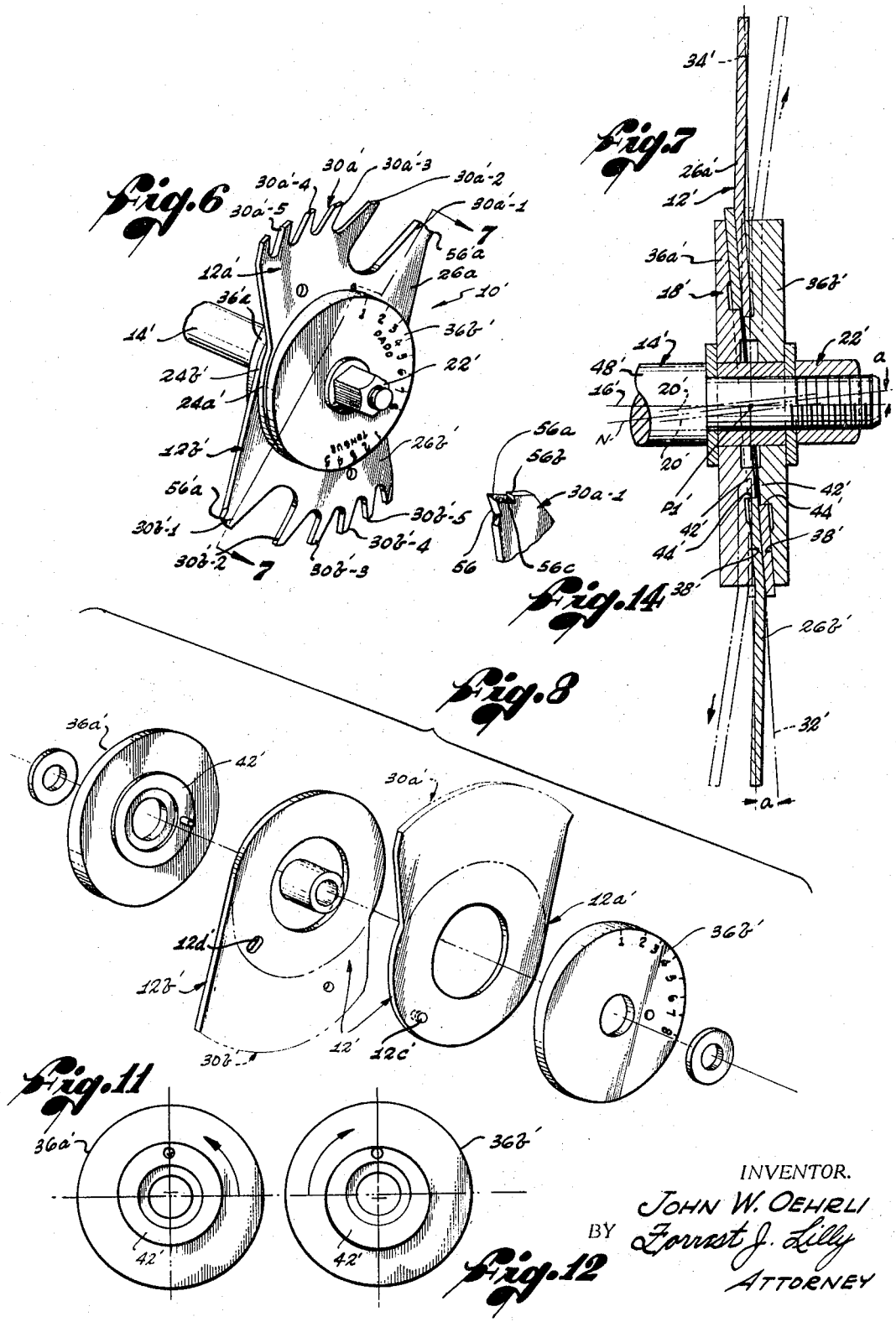

3,318,348
ADJUSTABLE DADO AND TONGUE
CUTTING TOOL
John W. Oehrli, 251 Tranquillo Road,
Pacific Palisades, Calif. 90272
Filed Jan. 8, 1965, Ser. No. 424,245
20 Claims. (Cl. 144—238)

This invention relates generally to dado cutting tools and has more particular reference to improvements in adjustable dado cutters.

Adjustable dado cutters have existed in the art for many years. One of the earliest adjustable dado cutters was a so-called wobble saw. A wobble saw comprises a circular saw blade obliquely mounted between two rotary wedge plates in such a way that the blade is rotatably adjustable relative to the wedge plates between a minimum cutting width position, wherein the plane of the blade is approximately normal to the rotation axis of the wedge plates, and a maximum cutting width position, wherein the plane of the blade is inclined to the rotation axis. In its minimum cutting width position, the effective cutting width of the blade is substantially equal to the thickness of the blade. In its maximum cutting width position, the effective cutting width of the blade is approximately equal to the axial spacing between two planes normal to the rotation axis of the wedge plates and tangent to two diametrically opposite sides of the inclined blade. Such a wobble saw is subject to two serious defects. First, the wobble saw has substantial dynamic unbalance, particularly when the saw blade is set in its maximum cutting width position. This dynamic unbalance limits the rotational speed of the wobble saw. Secondly, the cutting motion of the saw teeth of a wobble saw through a workpiece occurs along a direction line transverse to the plane of the blade. This transverse motion of the saw teeth causes early fatigue of the blade, because of the fact that the blade is relatively thin and its teeth are designed only for cutting motion in the plane of the blade, and creates a serious safety hazard which has outlawed the sale of wobble saws in many localities.

An adjustable dado cutting tool in current wide spread use comprises a rotary cutting member, including a central hub plate with a number of approximately coplanar, uniformly circumferentially spaced, radially projecting cutters, and a pair of rotary, coaxial wedge plates between which the rotary cutting member is mounted in such manner that the member is rotatably adjustable relative to the wedge plates between a minimum cutting width position, wherein the common plane of the cutters is approximately normal to the rotation axis of the wedge plates, and a maximum cutting width position, wherein the cutter plane is inclined to the rotation axis. While this adjustable dado cutting tool is superior to the old wobble saw, it also possesses certain inherent deficiencies. One of the great disadvantages of the dado cutting tool referred to resides in the fact that different cutters of the tool cut the side walls of the dado in different cutting width settings of the rotary cutting member. That is to say, such a dado cutter is commonly equipped with eight cutters arranged in two diametrically opposed groups of four cutters each. In one setting of the rotary cutting member, corresponding to a particular effective cutting width of the dado cutting tool, one cutter, say, the number one cutter, of each cutter set is disposed to cut the side walls of the dado. In another setting of the cutting member, two other cutters of the two cutter sets, such as the number three cutters, cut the dado side walls, while in yet another position of adjustment, two still different cutters of the two cutter sets, such as the number four cutters, may cut the side walls. As a consequence, all eight cutters of the dado cutting tool must be sharpened to provide them with both side or radial cutting edges for cutting a side wall of the dado and top or lateral cutting edges for cutting the bottom of the dado. The cutters must be sharpened in this way, of course, even though a particular dado cutting tool may be operated most of the time in one particular setting, for the reason that the possibility of adjustment of the tool to some other setting always exists.

This requirement of a side cutting edge and a top cutting edge on each cutter of the dado cutting tool under consideration is a distinct disadvantage for two reasons. First, periodic resharpening of the cutters is difficult and time consuming if performed by an individual owner of a dado cutter and involves a substantial, periodic cost if performed by a commercial sharpening facility. Secondly, carbide tipping of the cutters, as is now common practice on dado cutters, is very costly. For example, to carbide tip each cutter of a dado cutting tool of the character described costs on the order of two dollars. To carbide tip all eight cutters of such a dado cutting tool, therefore, runs on the order of sixteen dollars.

Another distinct disadvantage of the existing dado cutting tool results from the fact that the eight cutters of the tool are uniformly spaced about, and throughout a full 360 degrees of, the adjustable rotary cutting member of the tool. Because of this uniform distribution of the cutters, the latter are not used efficiently and do not have a definite cutting sequence in all positions of adjustment of the rotary cutting member. In other words, in many settings of the cutting member, certain of the cutters follow in the paths of preceding cutters and thus tend to cut the same portion of the dado as the preceding cutters. Moreover, in some angular settings of the rotary cutting member, certain of the cutters on the member have effective negative clearance angles with respect to the direction of motion of the respective cutters. Such a negative clearance angle, of course, is highly undesirable and results in loss of cutting efficiency, overheating, and rapid wearing of the cutters.

Other disadvantages of the existing adjustable dado cutting tool under consideration resides in the fact that the tool is composed of a relatively large number of parts and is, therefore, quite costly to manufacture. In addition, the rotary cutting member of the tool comprises rectangular cutting bars permanently embedded in a central cast hub. These projecting cutter bars present a serious potential safety hazard due to the possibility of their fracture upon contact with the workpiece. If one of the cutting bars does break, the entire cutting member must be replaced, which represents a substantial cost. The existing dado cutting tool being discussed also possesses dynamic unbalance of the same order or of a greater order than that of the wobble saw. Accordingly, the rotary cutting speed of the tool is limited. The existing dado cutter with radially projecting cutter bars is actually inferior to the old wobble saw in at least one respect. Thus, the cross-sectional dimensions of the individual cutter bars must be such as to provide the bars with sufficient strength to withstand the cutting forces imposed thereon. As a consequence, the width dimension of the cutter bars, that is, the dimension of the bars transverse to the direction of their cutting motion, is relatively large, and substantially greater than the thickness of the wobble saw blade. The minimum dado width which may be cut with the existing adjustable dado cutter is thus substantially greater than the minimum dado width which may be cut with a wobble saw. At least one of the adjustable dado cutters with radially projecting cutter bars which is currently available on the market is also deficient in that the rotary bearing for the adjustable rotary cutting member is axially centered on the rotation axis of the wedge plates, rather than on the inclined axis about which the cutting member is rotatably adjusted to vary the effective cutting width of the tool. Accordingly, this bearing provides poor bearing support for the cutting member and is subject to rapid wear.

There remains for discussion one further and highly important disadvantage of the existing adjustable dado cutting tools. This disadvantage resides in the fact that during angular adjustment of the rotary cutting member, to vary the effective cutting width of the dado cutting tool, the common plane of the cutters on the cutting member is effectively rotated about an axis normal to the rotation axis of the tool. As a consequence, the radial distance between the radially outer tips of the cutters and the rotation axis changes during such cutting width adjustment, said radial distance decreasing when the rotary cutting member is adjusted toward its maximum cutting width position and said radial distance increasing when the rotary cutting member is adjusted toward its minimum cutting width position. This change in the radial distance between the tips of the cutters and the rotation axis of the tool in response to adjustment of the effective cutting width of the tool results in the cutting of a dado having a stepped, concave bottom wall at all settings of the rotary cutting member except that at which the tips of its cutters are initially sharpened. A dado with such a stepped, concave bottom wall, while perhaps not undesirable in some applications, is highly unsatisfactory and undesirable in precision woodworking operations, as, for example, those involved in the construction of fine furniture.

It is apparent at this point, therefore, that there is a definite need for an improved adjustable dado cutting tool which does not possess the disadvantages discussed above.

A general object of this invention is to provide such an improved adjustable dado cutting tool.

Another object of the invention is to provide an adjustable dado cutting tool equipped with two sets of cutters including a pair of leading cutters which are effective to cut the side walls of the dado in every position of adjustment of the rotary cutting member of the tool, whereby only said leading cutters need be sharpened to have side or radial cutting edges for the dado side walls.

A highly important object of the invention, related to the foregoing objects, is to provide an adjustable dado cutting tool which may be more quickly and easily resharpened and wherein only the two leading cutters, which cut the dado side walls, need be carbide tipped, if desired, whereby the cost of carbide tipping the present dado cutter is substantially reduced.

Yet another object of the invention is to provide an adjustable dado cutting tool wherein the cutters are arranged to cut in a definite sequence in all settings of the rotary cutting member, without any cutter retracing the path of a preceding cutter except in the minimum cutting width setting of the cutting member, whereby the cutters are arranged for optimum cutting efficiency.

Still another object of the invention is to provide an adjustable dado cutting tool construction which permits a unique non-uniform spacing of the cutters in each cutter set, as well as a minimum number of cutters, whereby the mass of those portions of the rotary cutting member which create dynamic unbalance in the tool and hence the dynamic unbalance of the tool are minimized.

A further object of the invention is to provide an adjustable dado cutting tool which is capable of cutting a dado of minimum width substantially less than that possible with most existing adjustable dado cutters.

Yet a further object of the invention is to provide an adjustable dado cutting tool wherein the cutters are adjusted radially as the effective cutting width of the tool is adjusted, in such manner as to render the tool capable of cutting a dado with a flat bottom.

A still further object of the invention is to provide an adjustable dado cutting tool having a unique cutting edge configuration on its two leading cutters which is effective to produce a combined scratcher and raker cutting action.

A further object of the invention is to provide an adjustable dado cutting tool wherein the rotary cutting member comprises a sheet metal blade, or blades, which may be simply and economically fabricated by a stamping and forming operation and, when damaged, may be replaced at relatively low cost.

Other objects of the invention are concerned with providing an adjustable dado cutting tool which possesses substantially less dynamic unbalance then the existing adjustable cutters, embodies a minimum number of parts, is relatively economical to manufacture, provides effective bearing support for the angularly adjustable cutting member of the tool, is safe to use, easy to adjust, and is otherwise ideally suited to its intended purposes.

Another important object of the invention is to provide an adjustable dado cutting tool of the kind set forth in the foregoing objects which is adjustable beyond its normal range of adjustment for dado cutting to cut tongues of various widths for insertion into dadoes of corresponding width, thereby to form tongue and groove joints.

An object of the invention related to the foregoing object is to provide an adjustable dado cutting tool which is effective to simultaneously cut both sides of a tongue in such manner that the tongue width may be accurately predetermined, and wherein the trailing cutters of the two cutter sets of the tool are uniquely configured to provide them with a positive clearance angle when cutting the tongue side walls.

With these and other objects in view, the invention consists in the construction, arrangement and combination of the various parts of the invention, whereby the objects contemplated are attained, as hereinafter set forth, pointed out in the appended claims, and illustrated in the accompanying drawings, wherein:

FIG. 1 is a perspective view of an adjustable dado and tongue cutting tool according to the invention;

FIG. 2 is an enlarged section through the tool in FIG. 1;

FIG. 3 is an enlarged axial view of the tool in FIG. 1;

FIG. 4 is a view of the cutting blade of the tool in FIG. 1, looking in a direction normal to the rotation axis of the tool and showing the blade in its maximum dado cutting width position;

FIG. 5 is a view similar to FIG. 4, showing the blade adjusted beyond its maximum dado cutting width position to a tongue cutting position;

FIG. 5a is an enlarged view looking in the direction of the arrows on line 5a—5a in FIG. 5;

FIG. 5b is a view looking in the direction of the arrow 5b in FIG. 5a;

FIG. 5c is a perspective view of a dado cut by the tool in FIG. 1;

FIG. 5d is a perspective view of a tongue cut by the tool in FIG. 1;

FIG. 6 is a perspective view of a modified adjustable dado cutting tool according to the invention;

FIG. 7 is an enlarged section through the tool in FIG. 6 taken on line 7—7 in FIG. 6;

FIG. 8 is an exploded view of the tool in FIG. 6;

FIG. 9 is an enlarged section through a first wedge plate embodied in the tool in FIG. 6;

FIG. 10 is an enlarged section through a second wedge plate embodied in the tool in FIG. 6;

FIG. 11 is a view of the right-hand face of the wedge plate in FIG. 9;

FIG. 12 is a view of the left-hand face of the wedge plate in FIG. 10;

FIG. 13 diagrammatically illustrates a compensating adjustment involved in the tool in FIG. 6; and FIG. 14 is a perspective view of one leading cutter of the tool in FIG. 6.

The dado cutting tool 10 illustrated in FIGS. 1–5 of these drawings comprises a rotary cutting member 12 and a rotary supporting member 14 therefore having a central axis 16 of rotation. Supporting member 14 includes means 18 mounting the cutting member 12 for angular adjustment relative to the supporting member about an adjustment axis 20 inclined at an acute angle $a$ relative to the rotation axis 16, and means 22 for securing the cutting member to the supporting member for rotation of the cutting and supporting members in unison about the rotation axis 16 to cut a dado. The cutting member 12 is represented in the drawings as a blade which is stamped from sheet metal. This blade includes a flat, central hub portion 24 and substantially flat blade portions 26a and 26b extending generally radially from the flat, central hub portion 24. The radially extending blade portions 26a, 26b are located generally diametrically opposite one another and are joined to the flat hub portion 24 by intervening laterally deformed blade portions 28a and 28b, respectively. Blade portion 26a terminates at its radially outer extremity in a set 30a of circumferentially spaced cutters 30a–1 through 30a–5. The blade portion 26b terminates at its radially outer extremity in a set 30b of circumferentially spaced cutters 30b–1 through 30b–5. In the ensuing description and claims, the cutters 30a–1 and 30b–1 are referred to as leading cutters, the remaining cutters are referred to as following cutters, and the cutters 30a–5 and 30b–5 are referred to as trailing cutters. It is apparent that the cutting blade 12 is adapted to be simply and economically fabricated from sheet steel by a simple combined stamping and forming operation. The blade is then hardened by heat treating it. In addition, the leading cutters 30a–1 and 30b–1 may be carbide tipped or given more hardness by induction hardening, etc. As mentioned earlier, and hereinafter explained in detail, a highly important feature of the invention resides in the fact that only the leading cutters need be carbide tipped.

As may be best observed in FIG. 2, the radially extending blade portions 26a and 26b of the cutting blade 12 are laterally offset to opposite sides of the plane 32 of the flat central hub portion 24. As will appear presently, the plane 32 of the central hub portion is normal to the inclined adjustment axis 20. The blade portions 26a, 26b and their respective cutter sets 30a, 30b have a common medial plane 34 which is inclined at the acute angle $a$ relative to the plane 32 of the central hub portion 24.

At this point, therefore, it is apparent that the cutting blade 12 is angularly adjustable relative to its supporting member 14 between the position shown in FIG. 2 and hereinafter referred to as its minimum dado cutting width position, or simply minimum cutting width position, wherein the medial plane 34 is normal to the rotation axis 16, and the position shown in FIG. 4 and hereinafter referred to as its maximum dado cutting width position, or simply maximum cutting width position, wherein the medial plane 34 of the blade is inclined at an angle equal to $2a$ relative to a plane normal to the rotation axis. It is important to note here that the blade portions 26a and 26b are laterally offset into the common medial plane 34 where they emerge from the supporting member 14, whereby the dado cutting tool under consideration has minimum dynamic unbalance and a maximum permissible depth of cut. In this cutting tool, the rotation axis 16 and the adjustment axis 20 intersect at a point $P_1$. The plane 32 of the flat hub portion 24 of the blade and the medial plane 34 of the cutter sets 30a, 30b intersect along a line of intersection $L_1$ which passes approximately through the intersection point $P_1$, normal to the rotation axis 16.

The adjustable mounting means 18 for the blade 12 comprises a pair of circular wedge plates 36a and 36b which are centered on the rotation axis 16 of the dado cutting tool. These wedge plates have parallel confronting faces 38 normal to the adjustment axis 20. A pin 40, fixed in one wedge plate and slidably received in a bore in the other wedge plate, retains the two wedge plates in the relative angular positions shown in FIG. 2, wherein the wedge plate faces 38 are parallel to one another and normal to the adjustment axis 20. Projecting from the face 38 of each wedge plate, normal to the respective face, is a cylindrical bearing shoulder 42. The two bearing shoulders 42 have the same outside diameter and are centered on the adjustment axis 20. The hub portion 24 of the blade 12 has a bore 44 extending therethrough on an axis normal to the plane 32 of the hub portion and of a diameter to slidably receive the wedge plate bearing shoulders 42. The bearing shoulders 42 are axially dimensioned so that when the wedge plate faces 38 seat against opposite sides of the hub portion 24, the confronting ends of the shoulders project into the central bore 44 in the blade, to rotatably support the latter, and have their opposing end faces slightly spaced, as shown, to permit the wedge plates to be clamped against the blade.

The wedge plates are thus clamped against the blade 12 by the blade securing means 22. This blade securing means comprises a nut threaded on the reduced end 46 of a shaft 48 which is adapted to be coupled to a means for driving the dado cutting tool 10 in rotation. The reduced shaft end 46 extends through a bushing 50 which is positioned in central bores 52 in the wedge plates 36a, 36b. These wedge plate bores are centered on the central axis 16 of rotation of the dado cutting tool. A pair of washers 54 are mounted on the shaft end 46 at opposite sides of the wedge plates, as shown. It is now apparent, therefore, that the nut 22 may be tightened to firmly clamp the blade 12 between the wedge plates 36a, 36b, thereby to permit rotation of the blade and wedge plates as a unit to cut a dado. When the nut 22 is backed off slightly, to relieve the pressure of the wedge plates against the blade, the latter may be rotatably adjusted relative to the wedge plates about the adjustment axis 20.

It is important to note in FIG. 3 that one entire cutter set, e.g., cutter set 30a, on the cutting blade 12 is located at one side of the line $L_1$ of intersection of the plane 32 of the flat hub portion 24 of the blade and the common medial plane 34 of the two cutter sets 30a, 30b. The other entire cutter set 30b is located at the opposite side of this line of intersection. It is also important to note that the angle $b$ intercepted by each cutter set 30a and 30b is substantially less than 135 degrees and that the angle $c$ measured in the medial plane 34 between an axial plane $P_2$, normal to the line of intersection $L_1$ and containing the rotation axis 16, and the leading cutter 30a–1 and 30b–1 of each cutter set is less than the angle $d$ between the latter plane and the trailing cutter 30a–5 and 30b–5 of each cutter set. The reason for this particular angular relationship, and the manner in which the optimum values of the angles $b$, $c$ and $d$ are arrived at, will be explained shortly. At this point, however, it is noted that in a particularly successful embodiment of the invention, the angle $c$ is on the order of 28 degrees and the angle $d$ is on the order of 36 degrees, resulting in an angle $b$, for each cutter set, on the order of 64 degrees. While these angular values are optimum, they are not critical. Accordingly, the invention should not be regarded as limited to the precise angles mentioned.

It is apparent from the description thus far that the rotation axis 16 and the adjustment axis 20 define a plane $P_3$ which contains the latter axes, is normal to the wedge plates 36a, 36b, and intersects the plane 32 of the flat hub portion 24 of the blade 12 and the median plane 34 of the cutter sets 30a, 30b along lines of intersection which pass through the point $P_1$ of intersection of the axes 16, 20. When the cutting blade 12 occupies its minimum cutting width setting, shown in FIG. 2, the planes $P_2$ and $P_3$ are coincident, as shown in FIG. 3. When the cutting blade is adjusted from its minimum dado cutting width setting to its maximum dado cutting width setting, the plane $P_2$ rotates relative to the plane $P_3$ through an angle which, according to this invention, is substantially less than 180 degrees and is on the order of 110 degrees.

It is apparent that because of the angle of the wedge plate faces 38, each wedge plate has a section $T_1$ of maximum thickness and a diametrically opposed section $T_2$ of minimum thickness, both located in the plane $P_3$ containing the rotation axis 16 and the adjustment axis 20. In the ensuing description, these sections of maximum and minimum thickness of the wedge plates are referred to as the high and low points, respectively, of the wedge plates. It is obvious, of course, that the high point of one wedge plate is located directly opposite the low point of the other wedge plate. It is important to note that when the cutting blade 12 occupies its minimum dado cutting width setting, the leading and trailing cutters of cutter set 30a are located at opposite sides of the high point $T_1$ of the wedge plate 36a and the leading and trailing cutters of the other cutter set 30b are located at opposite sides of the high point $T_1$ of the other wedge plate 36b. It is further important to note that during adjustment of the cutting blade 12 from its minimum dado cutting width position to its maximum dado cutting width position, the leading cutter 30a–1 of cutter set 30a rotates toward the low point $T_2$ of the wedge plate 36a while the trailing cutter 30a–5 of this cutter set rotates toward the high point $T_2$ of the latter wedge plate. Similarly, the leading cutter 30b–1 of the other cutter set 30b rotates toward the low point $T_2$ of the other wedge plate 36b while the trailing cutter 30b–5 of the latter cutter set rotates toward the high point $T_2$ of the latter wedge plate. It is thus apparent that when the cutting blade 12 is rotated from its minimum cutting width position toward its maximum cutting width position, the several cutters of the two cutter sets 30a and 30b undergo a compound motion having a rotational component about the adjustment axis 20 and a lateral or axial component in the direction of the rotation axis 16. It is to be further noted that these axial components of the leading cutters 30a–1, 30b–1 are equal and opposite as are the axial components of the trailing cutters 30a–5, 30b–5, and further that the axial components of the leading and trailing cutters of each cutter set occur in opposite directions of the rotation axis 16. Thus, referring to FIG. 2, when the cutting blade 12 is rotated from its illustrated minimum cutting width position toward its maximum cutting width position, the leading cutter 30a–1 of the upper cutter set 30a moves to the left, whereas the respective trailing cutter 30a–5 moves to the right. Similarly, the leading cutter 30b–1 of the lower cutter set 30b moves to the right, whereas the respective trailing cutter 30b–5 moves to the left. Looked at in another way, rotation of the cutting blade 12 from its minimum cutting width position to its maximum cutting width position is effective to rotate the medial plane 34 of the blade, about the intersection line $L_1$, from its position normal to the rotation axis 16 to a position inclined to the rotation axis. As noted earlier, when the cutting blade is in its maximum cutting width setting, the medial plane of the blade is inclined at an angle $2a$ relative to a plane normal to the rotation axis.

At this point, therefore, it is apparent that when the cutting blade 12 occupies its minimum cutting width setting, the dado cutting tool 10 is effective to cut a dado having a width substantially equal to the thickness of the blade 12. In other words, the blade has an effective cutting width substantially equal to its thickness. When the blade is adjusted to its maximum cutting width setting, the blade is effective to cut a dado having a width equal to the axial spacing, along the rotation axis 16, between two planes normal to the latter axis and tangent to the perimeter of the blade at the positions of intersection of the perimeter by the plane $P_2$ which is normal to the intersection line $L_1$ and contains the adjustment axis 20. The angle $d$ between the plane $P_2$ and each trailing cutter 30a–5 and 30b–5 is made such that when the cutting blade 12 is set in its maximum cutting width position of FIG. 4, the two trailing cutters are located substantially in a common plane normal to the rotation axis 16 and passing midway between the two leading cutters 30a–1 and 30b–1. As shown in FIG. 4, the five cutters of each cutter set 30a and 30b are circumferentially spaced so that each succeeding cutter in each cutter set is laterally offset, in a direction parallel to the rotation axis 16, from the preceding cutters of its respective cutter set. Accordingly, it is apparent that the cutters cut in a definite sequence, that is, the cutters of each set cut successively from one side of the dado toward its center line, and no two cutters trace the same cutting path, except in the minimum cutting width setting of the blade 12.

At this point, one highly important advantage of the present dado cutting tool is apparent. To understand this advantage, assume that the cutting blade 12 is initially adjusted to its minimum cutting width setting of FIGS. 2 and 3, and assume further a reference plane which is normal to the rotation axis 16 and contains the cutting blade 12 when the latter occupies its minimum cutting width position. This reference plane, then, is coincident with the medial plane 34 of the cutting blade when the latter occupies its minimum cutting width position. Under these conditions, all of the cutters lie in the reference plane and the blade 12 may be conditioned to efficiently cut a dado by simply sharpening the cutters in such a way as to provide one of the leading cutters 30a–1, 30b–1 with a side or radial cutting edge for cutting one side wall of the dado, the other leading cutter with a side or radial cutting edge for cutting the opposite side of the dado, and all of the cutters with lateral cutting edges for cutting the bottom of the dado. In other words, when the cutting blade is set in its minimum cutting width position, only the two leading cutters need have side cutting edges for cutting the side walls of the dado. Assume now that the cutting blade is rotated relative to the wedge plates 36a, 36b toward its maximum cutting width position. It is apparent from the description thus far of the dado cutting tool 10 that during this adjustment of the cutting blade, the two leading cutters 30a–1 and 30b–1 have effective axial components of motion in opposite directions of the rotation axis 16 and away from the aforementioned reference plane. The two trailing cutters 30a–5 and 30b–5, on the other hand, have effective components of axial motion toward the reference plane. Moreover, because of the fact that the leading cutters 30a–1, 30b–1 are rotating away from the high points of the wedge plates, whereas the trailing cutters 30a–5 and 30b–5 are rotating toward said high points, the rates of the axial components of the leading cutters are increasing while the rates of the axial components of the trailing cutters are decreasing. It is apparent, therefore, that in all positions of adjustment of the cutting blade 12, the spacing, in the direction of the rotation axis 16, between each leading cutter 30a–1 and 30b–1 and the aforementioned reference plane is greater than the axial spacing between said plane and any of the remaining cutters. In other words, in every position of adjustment of the cutter blade 12, the leading cutters 30a–1 and 30b–1 are located farthest out along the rotation axis 16 and are thus disposed to cut the side walls of a dado. The remaining cutters are required only to cut the bottom wall of the dado. As a consequence, only the leading cutters need be provided with side or radial cutting edges for cutting the dado side walls.

In line with this advantage, each leading cutter 30a–1 and 30b–1 is shown to have an outer radial or side cutting edge 56 and a top or lateral raker edge 58. The remaining cutters are provided only with top raker edges 58. Periodic resharpening of the cutting blade 12 is thus a relatively simple matter which involves dressing the front and top surfaces of the two leading cutters 30a–1 and 30b–1 only and only the top surfaces of the remaining cutters 30a–2 through 30a–5 and 30b–2 through 30b–5. Moreover, since only the leading cutters cut the side walls of a dado in every position of adjustment of the cutting blade 12, it is necessary only to carbide tip the leading cutters in the event that it is desired to thus render the cutting blade immune to wear. As noted earlier, this requirement of only two carbide tipped cutters, involving a cost of some four dollars, represents a distinct economic advantage over the existing adjustable dado cutting tools which require carbide tipping of all of the cutters at a total cost on the order of sixteen dollars for a typical dado cutter. The present dado cutting tool under consideration also, obviously, possesses the other advantages mentioned earlier, to wit, a minimum number of parts, economy of manufacture, effective bearing support for the cutting blade 12, reliability, and ease of adjustment and use.

As noted earlier, the radially extending portions 26a and 26b of the cutting blade 12 are laterally offset into the medial plane 34 of the cutter sets 30a, 30b at the positions where the blade portions emerge from the supporting member 14, that is, where the blade portions emerge from the wedge plates 36a, 36b. This reduces the dynamic unbalance of the present cutting tool, particularly when the latter is set in its minimum cutting width position. An additional reduction in the dynamic unbalance of the tool is realized as follows: Referring to FIG. 4, it will be observed that in the maximum cutting width setting of the blade, shown in that figure, the cutting edges 58 of the cutters in each cutter set 30a and 30b rotate in parallel planes normal to the plane of the paper in the figure and to the rotation axis 16 in the figure. It is obvious that if the cutting blade is to cut a laterally continuous dado, the adjacent ends of two successive cutting edges must be aligned or slightly overlapped in the direction of rotation of the cutting edges. It is futher apparent from FIG. 4 that the perimeter of the cutting blade is approximately parallel to the direction of rotation of the cutting edges in the vicinity of the leading cutter of each cutter set and that the perimeter recedes inwardly toward the center line of the dado, at an increasing rate of curvature, toward the trailing cutter of each cutter set. Accordingly, the leading cutter and the second cutter of each cutter set may be spaced a substantial distance apart and still comply with the requirement that the adjacent ends of the cutting edges 58 on these two cutters be aligned in the direction of their rotation. Because of the increasing inward curvature of the perimeter of the cutting blade toward the center line of the dado, the spacing between each successive pair of adjacent cutters must be progressively diminished in order to comply with this requirement.

This results in or permits the non-uniform cutter spacing illustrated in the drawings. Thus, it will be observed that the spacing between each leading cutter and its following second cutter is relatively large and is substantially greater than the spacing between the second and third cutters of the respective cutter sets. This latter spacing, in turn, is greater than the spacing between the third and fourth cutters of the respective cutter sets and so on.

Such a non-uniform cutter spacing is advantageous for the reason that the number of cutters in each cutter set is minimized and the relatively large spaces between adjacent cutters, particularly between each leading cutter and its following second cutter, represent the elimination of substantial masses of the blade material. As a consequence, the effective mass of the cutting blade 12 in the regions of the cutter sets 30a, 30b, which regions create the major dynamic unbalance of the dado cutting tool, is substantially reduced. The dynamic unbalance of the tool, particularly in its maximum cutting width setting, is reduced accordingly.

At first glance, it might appear that the spacing between adjacent cutters is most critical when the cutting blade 12 is set in its maximum cutting width position. That is to say, it might seem that if a particular non-uniform cutter spacing satisfied the requirement of alignment of the adjacent ends of the cutting edges 58 on adjacent cutters in the maximum width setting of the blade 12, this requirement would be met in all other lesser cutting width settings of the blade. It has been determined, however, that the cutter spacing is most critical at a setting of the blade just a few degrees, i.e., about 23 degrees, before its maximum dado cutting width position. Accordingly, the cutter spacing must be made such as to satisfy the above stated requirement in the latter blade setting.

Up to this point, the discussion has concerned itself with settings of the blade 12 which are effective to produce a laterally continuous dado. In this regard, it will be recalled that when the blade 12 is adjusted relative to the wedge plates 36a, 36b, the cutters of the cutter sets 30a, 30b have lateral components of motion parallel to the rotation axis 16 and that when the blade is adjusted from its minimum cutting width position to its maximum dado cutting width position, the trailing cutters 30a–5, 30b–5 move axially toward and across a reference plane normal to the axis 16 and passing through the intersection point $P_1$ while the leading cutters 30a–1, 30b–1 move axially away from said plane. Let us assume now that the blade is adjusted beyond its maximum dado cutting width position so that the trailing cutters rotate past the high points $T_1$ of the wedge plates. When this occurs, the directions of axial motion of the trailing cutters are reversed and the latter cutters commence axial motion back across the reference plane and are thus no longer aligned in the direction of their rotation to cut a laterally continuous dado. FIG. 5, for example, shows the blade 12 adjusted to a position beyond its maximum dado cutting width position wherein the trailing cutters are offset to opposite sides of the reference plane. If the cutting tool is used with this blade setting, therefore, it would, in effect, cut two parallel dadoes separated by an uncut rib or tongue. The width of this tongue may be varied by changing the setting of the blade.

According to the invention, this ability of the present cutting tool to be set in such a way as to cut an upstanding tongue is utilized to make tongue and groove joints. Thus, when making such a joint, a dado or groove is cut in one workpiece by setting the blade 12 in one of its dado cutting positions and a tongue for engaging in the groove is cut on another workpiece by adjusting the blade beyond its maximum dado width cutting position to one of its tongue cutting positions which will produce a tongue of a width to fit properly in the groove. It is important to note here that the blade cuts both sides of the tongue, whereby the proper tongue width for a particular groove may be accurately obtained.

It is apparent that the actual cutting of the tongue side walls is performed by the trailing cutters 30a–5, 30b–5. To this end, these cutters are provided with side or radial cutting edges 56' similar to but on the opposite sides of the blades from the side cutting edges 56 of their respective leading cutters 30a–1, 30b–1. It will be observed in FIG. 5 that the sides of the cutters are inclined at such an angle relative to a tongue cut by the tool that the cutters have effective negative clearance angles relative to the side walls of the tongue. According to this invention, the trailing cutters 30a–5, 30b–5, which actually cut the tongue side walls, are provided with a positive clearance angle for this purpose. In the drawings, for example, the trailing cutters are twisted slightly, as shown in FIGS. 5 and 5a, to provide them with such positive clearance angles relative to the tongue side walls. In the alternative, the cutter side surfaces facing the tongue may be relieved behind the side cutting edges 56' to provide the cutters 30a–5, 30b–5 with the required positive clearance angles.

It is apparent, of course, that a cutting tool according to the invention may be designed to cut both dadoes and tongues, or dadoes only, or tongues only. In a tool to be used for dado cutting only, only the leading cutters 30a–1, 30b–1 need have side cutting edges, i.e., cutting edges 56. In a tool for cutting tongues only, the latter side cutting edges may be eliminated and only the trailing cutters 30a–5, 30b–5 need have side cutting edges, i.e., cutting edges 56'.

Reference is now made to FIGS. 6–13 illustrating an alternative embodiment of the present dado cutting tool. This modified dado cutting tool is basically similar to that just described and, for this reason, the component parts of the tool in FIGS. 6–13 are designated by the same basic reference numerals as the corresponding parts of the first tool with the addition of the prime notation. Thus, the adjustable dado cutting tool 10' illustrated in FIGS. 6–13 comprises a rotary cutter means 12' mounted on a supporting member 14' having a central axis 16' of rotation. The cutter means 12' includes two sets 30a' and 30b' of circumferentially spaced cutters 30a'–1 through 30a'–5 and 30b'–1 through 30b'–5, respectively. Cutter sets 30a' and 30b' are located diametrically opposite one another and have a common medial plane 34'. At this point, attention is directed to the fact that in the first form of the invention, the diametrically opposed, radially extending blade portions 26a and 26b are disposed in the medial plane 34 throughout their radial extent from the deformed blade portions 28a and 28b to their radial outer extremities. In the modified dado cutting tool of FIGS. 6–13, the corresponding blade portions 26a' and 26b' are inclined slightly to the medial plane 34', whereby the latter is a medial plane only with respect to the outer tips of the cutters in the two cutter sets 30a', 30b'. Supporting member 14' includes means 18' mounting the cutter means 12' for angular adjustment, relative to the supporting member, between a minimum cutting width position, shown in solid lines in FIG. 7, wherein the medial plane 34' of the cutter means is normal to the rotation axis 16', and a maximum cutting width position, shown in phantom lines in FIG. 7, wherein the medial plane 34' is inclined to the rotation axis. Included in the supporting member 14' is a means 22' for securing the cutter means 12' to the supporting member for rotation of the cutter means and supporting member in unison to cut a dado.

In the form of the invention under consideration, the cutter means 12' includes two separate but similar cutting blades 12a' and 12b'. These cutting blades may be fabricated in the same way as the cutting blade in the earlier form of the invention. Cutting blades 12a' includes a flat central hub portion 24a' from which radially extends the blade portion 26a'. Similarly, the blade 12b' has a flat central hub portion 24b' from which radially extends the blade portion 26b'. The mounting means 18' of the supporting member 14' comprises two wedge plates 36a' and 36b' having parallel, confronting faces 38' which are perpendicular to a common normal N passing through the point $P_1$ of intersection of the rotation axis 16' with the medial plane 34' of the cutter means 12'. Projecting perpendicularly from each wedge plate face 38' is a cylindrical bearing shoulder 42'. Blade 12a' has a central bore 44', centered on an axis normal to its respective flat central hub portion 24a', slidably receiving the bearing shoulder 42' on one wedge plate. The other blade 12b' has a bore 44', centered on an axis normal to its respective flat central hub portion 24b', slidably receiving the bearing shoulder 42' on the other wedge plate. The two blades 12a' and 12b' are retained in fixed relative angular relationship by means of a pin 12c' which is press-fitted in the hub portion of one blade and engages in a radial slot 12d' in the hub portion of the other blade. The supporting member 14' comprises a shaft 48' which mounts the wedge plates 36a', 36b' in the same manner as in the earlier dado cutting tool. The means 22' comprises a nut threaded on this shaft, as before, which is effective to firmly clamp the cutter blades 12a', 12b', making up the cutter means 12', between the wedge plates 36a', 36b', thereby to effect rotation of the cutter means and supporting member in unison to cut a dado.

Except for the fact that cutter means 12' comprises two separate blades and the slight angular deviation between the blade portions 26a', 26b' and the medial plane 34' of the cutter means 12', the adjustable dado cutting tool 10' thus far described is essentially identical to the earlier dado cutting tool. Thus, the medial plane 34' of the cutter means 12' is inclined at the acute angle $a$ relative to a plane 32' parallel to and passing between the flat central hub portions 24a' and 24b' of the cutter blades 12a' and 12b'. One entire cutter set 30a' is located at one side of the line of intersection of the planes 32', 34', which line of intersection passes through the point $P_1'$ normal to the rotation axis 16'. The other entire cutter set 30b' is located at the opposite side of this line of intersection. Moreover, the cutters of each cutter set are angularly arranged relative to a plane (e.g., a plane corresponding to the plane $P_2$ in FIG. 3) normal to this line of intersection and containing the rotation axis 16' of the tool. It is apparent, therefore, that the modified dado cutting tool 10', as thus far described, operates in precisely the same way as the earlier adjustable dado cutting tool and possesses precisely the same advantages as the latter tool.

The modified adjustable dado cutting tool 10', however, is improved to avoid one inherent disadvantage of the earlier tool. This disadvantage was mentioned earlier and resides in the fact that when the cutting blade 12 in the earlier dado cutting tool is adjusted to vary the effective cutting width of the tool, the normal radial distance from the raker cutting edge of each cutter to the rotation axis 16 of the tool changes. In other words, as the cutting blade is adjusted from its minimum cutting width position to its maximum cutting width position, this radial distance decreases. When the blade is adjusted in the opposite direction, the radial distance increases. In actuality, the change in this radial distance varies from cutter to cutter depending upon its angular position relative to the effective axis about which the medial plane of the cutting blade rotates as the effective cutting width of the tool is adjusted. In FIG. 13, the change in the radial distance between the cutting edge 58 of one leading cutter and the rotation axis 16 which occurs during this adjustment is designated by the reference character D. This change in the normal radial distance of each cutter from the rotation axis produces a dado with a stepped, concave bottom at all settings of the cutting blade other than that at which the cutters of the blade are dressed. This stepped concavity of the dado bottom becomes more pronounced as the cutting blade is adjusted away from its dressing position. At settings of the cutting blade close to its dressing position, the concavity of the dado is not too pronounced. In addition, in many applications, a dado with such a concave bottom wall is not undesirable. Accordingly, the earlier dado cutting tool of this invention is completely practical for some applications. In other applications, however, such as those involving the fabrication of fine furniture, dadoes with concave bottoms are highly undesirable.

The modified dado cutting tool 10' of FIGS. 6–13 avoids this problem. To this end, the cylindrical bearing shoulders 42' which rotatably support the blades 12a', 12b' are slightly eccentric to one another and to the wedge plates 36a', 36b'. Thus, the central or adjustment axis 20' of the cylindrical bearing shoulder 42' on the wedge plate 36a' intersects the medial plane of one blade hub portion 24' at a point P'a displaced slightly from the rotation axis 16'. Similarly, the central or adjustment axis 20' of the cylindrical bearing shoulder 42' on the other wedge plate 36b' intersects the medial plane of the other blade hub portion 24' at a point P'b slightly displaced from the rotation axis. These two points of intersection are substantially equally spaced from and are located at diametrically opposite sides of the rotation axis, as may be best observed in the drawings. In addition, the intersection points P′a and P′b are offset from the rotation axis 16′ in the direction of the low points T₂′ of their adjacent wedge faces. It is apparent, therefore, that when the cutter means 12′ is adjusted from its minimum cutting width position toward its maximum cutting width position, the two cutter sets 30a′ and 30b′ rotate toward the positions of maximum eccentricity of the bearing shoulders 42′ relative to the rotation axis 16′. As a consequence, as the cutter means 12′ is rotated toward its maximum cutting width position, the cutters of each cutter set are moved radially outward in such manner that the outward radial movement is greatest for the leading cutters and becomes progressively less for the following cutters. It has been determined that this outward radial component of motion of the cutters may be made to approximately offset the decrease in the radial distance of the cutters from the rotation axis which occurs when the cutter means 12′ is rotated toward its maximum cutting position, thereby to effectively maintain the cutters at a constant radial distance from the rotation axis throughout the range of adjustment of the cutter means 12′. In a successful embodiment of the invention, for example, the eccentricity e′ of each cylindrical bearing shoulder 42′, that is, the radial offset distance between the points P′a and P′b of intersection and the rotation axis 16′, is on the order of .028 inch.

FIG. 13 diagrammatically illustrates the above-described compensation which is effected by the eccentric bearing shoulders 42′. In this figure, the solid lines represent the cutter sets 30a′ and 30b′ in their minimum cutting width positions. The inner broken line arcs a represent projections into the plane of the paper of the paths which the cutting points 56′a of the leading cutters 30a′–1 and 30b′–1 would follow during adjustment of the cutter sets to their maximum cutting width positions if the intersection points P′a, P′b were located on the rotation axis 16′. The radial distance d of these arcs from the axis 16′ progressively decreases toward the maximum cutting width positions of the cutter sets for the reasons stated above. The outer broken line arcs b are drawn at a constant radius R₁ about the intersection points P′a, P′b, respectively, and represent projections into the plane of the paper of the approximate paths the cutting points 56′a would follow during adjustment of the cutter sets to their maximum cutting width positions if the angle between the rotation axis 16′ and the plane of the blades 12′ did not change. The remaining center broken line arc c represents projections into the plane of the paper of the resultant actual paths followed by the cutting points 56′a during adjustment of the cutter sets. These arcs are at substantially a constant radius R₂ from the rotation axis 16′.

The adjustment axes 20′ are located in planes containing the high and low points of the respective wedge plates. This is not essential, however, since in some cases, the change in the normal radial distance between the cutters and the rotation axis which occurs in the first form of the invention may be more accurately compensated by offsetting the adjustment axes 20′ in the tool under consideration slightly from the planes containing the high and low points of their respective wedge plates. Location of the axes 20′ in the planes of the high and low points of the wedge plates, however, possesses the advantage of the wedge plates being identical, which advantage is lost when the axes 20′ are offset from the latter planes.

There remains for consideration the tooth configuration shown in FIG. 14 of the drawings. This tooth configuration is preferably embodied on the leading cutters on both dado cutting tools according to the invention. FIG. 14 shows only one leading cutter, to wit, cutter 30a–1. In the tooth configuration illustrated, the side cutting edge 56 of the cutter terminates at its upper end in a cutting point 56a which projects a slight distance radially beyond the plane of the lateral or raker cutting edge 56b on the cutter. It is apparent that the tooth configuration illustrated in FIG. 14 constitutes, in effect, a combined scratcher and raker tooth which possesses maximum cutting efficiency. The cutting point 56a and the raker edge 56b are simply formed by relieving or notching the forward top edge of the cutter, as illustrated at 56c. Sharpening edge 56 restores cutting efficiency without affecting the bottom of the cut.

It is apparent from the preceding description that the invention herein described and illustrated is fully capable of attaining the several objects and advantages preliminarily set forth.

While the invention has herein been shown and described in what is conceived to be certain of the most practical and preferred embodiments, it is recognized that departures may be made therefrom within the scope of the invention, which is not to be limited to the details disclosed herein but is to be accorded the full scope of the claims so as to embrace any and all equivalent devices.

I claim:
1. An adjustable dado cutting tool comprising:
a rotary supporting member having a central axis of rotation,
rotary cutter means including two generally diametrically opposed sets of circumferentially spaced cutters having a common medial plane,
cooperating means on said supporting member and said cutter means rotatably mounting said cutter means on said supporting member for angular adjustment of said cutter means relative to said supporting member in such manner that each said cutter set undergoes rotational motion about an adjustment axis inclined at a given acute angle relative to said rotation axis and inclined at the approximate complement of said given angle relative to said medial plane, whereby said cutter means is adjustable relative to said supporting member between a minimum cutting width position wherein said medial plane is approximately normal to said rotation axis and a maximum cutting width position wherein said medial plane is inclined to said rotation axis,
means for securing said cutter means to said supporting member for rotation of said supporting member and cutter means about said rotation axis in unison to cut a dado,
said medial plane intersecting said adjustment axis at a point, and a plane normal to said adjustment axis at said point intersecting said medial plane along a line of intersection approximately normal to said rotation axis,
each said cutter set including a leading cutter with a radial cutting edge approximately parallel to said medial plane for cutting a side wall of the dado and a lateral cutting edge extending transverse to said medial plane for cutting the bottom wall of the dado,
each said cutter set further including a number of cutters following the respective leading cutter and each having a lateral cutting edge extending transverse to said medial plane for cutting the bottom wall of the dado,
one entire cutter set being located at one side of said line of intersection and the other entire cutter set being located at the opposite side of said line of intersection, and
said leading cutter of each cutter set being located at one side of an axial plane normal to said line of intersection and containing said rotation axis and the trailing cutter of each cutter set being located at the opposite side of said axial plane.
2. An adjustable dado cutting tool according to claim 1 wherein:

the angle in said medial plane between said axial plane and said leading cutter of each cutter set is less than the angle in said medial plane between said axial plane and the trailing cutter of the respective cutter set, and the angle in said medial plane between said leading and trailing cutters of each cutter seth is substantially less than 135 degrees.

3. An adjustable dado cutting tool according to claim 1 wherein:

the angle in said medial plane between said axial plane and said leading cutter of each cutter set is less than the angle in said medial plane between said axial plane and the trailing cutter of the respective cuttter set, and the angle in said medial plane between said leading and trailing cutters of each cutter set being substantially less than 135 degrees such that each cutter set cuts a maximum of approximately one-half the width of the dado cut by said cutter means when said cutter means is set in said maximum cutting width position.

4. An adjustable dado cutting tool according to claim 1 wherein:

the angle in said medial plane between said axial plane and said leading cutter of each cutter set is on the order of 28 degrees and the angle in said medial plane between said axial plane and said trailing cutter of the respective cutter set is on the order of 34 degrees.

5. An adjustable dado cutting tool according to claim 1 wherein:

said radial cutting edge on the leading cutter of each cutter set terminates at its radially outer end in a cutting point which is slightly higher than said lateral cutting edge of the respective leading cutter.

6. An adjustable dado cutting tool according to claim 1 wherein:

said cutter means comprises a sheet metal blade.

7. An adjustable dado cutting tool according to claim 1 wherein:

said cutter means comprises a pair of substantially identical sheet metal blades arranged side by side and each including one of said cutter sets.

8. An adjustable dado cutting tool according to claim 1 wherein:

said axial plane is approximately parallel to both said rotation axis and said adjustment axis when said cutter means occupies its minimum cutting width position, and said axial plane rotates through an angle of less than 180 degrees during rotation of said cutter means from said minimum cutting width position to said maximum cutting width position.

9. An adjustable dado cutting tool comprising:

a generally circular, rotary wedge plate having a central axis of rotation and an axially presented face inclined at a given acute angle relative to a plane normal to said axis, rotary cutter means including a flat central portion slidably seating against said face, and two generally diametrically opposed sets of circumferentially spaced cutters having a common medial plane inclined at said given acute angle relative to the plane of said flat central portion, cooperating means on said wedge plate and said cutter means rotatably mounting said cutter means on said wedge plate for angular adjustment of said cutter means relative to said wedge plate in such manner that each said cutter set rotates about an adjustment axis normal to said wedge plate face and said flat central portion of said cutter means, whereby said cutter means is adjustable relative to said wedge plate between a minimum cutting width position wherein said medial plane is approximately normal to said rotation axis and a maximum cutting width position wherein said medial plane is inclined to said rotation axis, means for securing said cutter means to said wedge plate for rotation of said wedge plate and cutter means about said rotation axis in unison to cut a dado, said medial plane intersecting said rotation axis at a point, and a plane passing through said point normal to said adjustment axis of each cutter set intersecting said medial plane along a line of intersection approximately normal to said rotation axis, each said cutter set including a leading cutter having a radial cutting edge approximately parallel to said medial plane for cutting a side wall of the dado and a lateral cutting edge extending transverse to said medial plane for cutting the bottom wall of the dado, each said cutter set further including a number of cutters following the respective leading cutter and each having a lateral cutting edge extending transverse to said medial plane for cutting the bottom wall of the dado, one entire cutter set being located at one side of said line of intersection and the other entire cutter set being located at the opposite side of said line of intersection, said leading cutter of each cutter set being located at one side of an axial plane normal to said line of intersection and containing said rotation axis and the trailing cutter of each cutter set being located at the opposite side of said axial plane, the angle in said medial plane between said axial plane and said leading cutter of each cutter set being less than the angle in said medial plane between said axial plane and the trailing cutter of the respective cutter set, and the angle in said medial plane between the leading and trailing cutters of each cutter set being substantially less than 135 degrees.

10. An adjustable dado cutting tool according to claim 9 wherein:

said cutter means comprises a sheet metal blade having a flat central portion normal to said adjustment axis of each cutter set and a pair of generally diametrically opposed, substantially flat blade portions extending generally radially from said central portion, said blade portions being laterally offset to opposite sides of the plane of said central portion, at least the radially outer extremities of said blade portions being disposed in said medial plane, and said cutter sets being located along said outer extremities of said blade portions.

11. An adjustable dado cutting tool according to claim 9 wherein:

said cutter means comprises a pair of similar sheet metal blades each including a flat central portion normal to said adjustment axis of each cutter set and a substantially flat blade portion extending generally radially from the respective central portion, said blades being disposed with said central portions thereof in close proximity and with said blade portions located diametrically opposite one another, at least the outer extremities of said blade portions being located in said medial plane, and said cutter sets being located along said outer extremities of said blade portions.

12. An adjustable dado cutting tool according to claim 9 wherein:

said axial plane is parallel to both said rotation axis and said adjustment axis of each cutter set when said cutter means occupies said minimum cutting width position, and said axial plane is rotatable through an angle less than 180 degrees during rotation of said cutter means from said minimum cutting width position to said maximum cutting width position.

13. An adjustable dado cutting tool comprising:

a rotary supporting member having a central axis of rotation, a pair of similar rotary cutter means, cooperating means on said supporting member and said cutter means rotatably mounting said cutter means in side by side relation on said supporting member for angular adjustment of said cutter means relative to said supporting member about spaced, substantially parallel adjustment axes inclined at a given acute angle relative to said rotation axis and intersecting a common plane normal to said rotation axis at diametrically opposite sides of and proximate to said rotation axis, each cutter means including a set of circumferentially spaced cutters which subtends an arc of substantially less than 135 degrees, and said cutter means being disposed with said cutter sets generally diametrically opposite one another, said cutter sets having a common medial plane inclined approximately at said given acute angle relative to a plane normal to said adjustment axes, whereby said cutter means are rotatable relative to said supporting member between a minimum cutting width position wherein said medial plane is approximately normal to said rotation axis and a maximum cutting width position wherein said medial plane is inclined to said rotation axis, means operatively interconnecting said cutter means for rotation of the latter in unison between said positions, means for securing said cutter means to said supporting member for rotation of said supporting member and cutter means about said rotation axis in unison to cut a dado, said medial plane intersecting said rotation axis at a point, and a plane normal to said adjustment axis at said point intersecting said medial plane along a given line of intersection approximately normal to said rotation axis, each said cutter set including a leading cutter with a radial cutting edge approximately parallel to said medial plane for cutting a side wall of the dado and a lateral cutting edge extending transverse to said medial plane for cutting the bottom wall of the dado, each said cutter set further including a number of cutters following the respective leading cutter and each having a lateral cutting edge extending transverse to said medial plane for cutting the bottom wall of the dado, one entire cutter set being located at one side of said line of intersection and the other entire cutter set being located at the opposite side of said line of intersection, said leading cutter of each cutter set being located at one side of an axial plane normal to said line of intersection and containing said rotation axis and the trailing cutter of each cutter set being located at the opposite side of said axial plane, and the angle in said medial plane between said axial plane and said leading cutter of each cutter set being less than the angle in said medial plane between said axial plane and the trailing cutter of the respective cutter set.

14. An adjustable dado cutting tool according to claim 13 wherein:

said axial plane is substantially parallel to both said rotation axis and said adjustment axes when said cutter means occupy said minimum cutting width position and said axial plane is rotatable through an angle less than 180 degrees during rotation of said cutter means from said minimum cutting width position to said maximum cutting width position.

15. An adjustable dado cutting tool according to claim 13 wherein:

each said cutter means comprises a sheet metal blade having a flat central portion normal to said adjustment axes and a substantially flat blade portion extending generally radially from the respective central portion, said central portions of said blades being disposed in close proximity, and said blade portions being laterally offset to opposite sides of a plane passing between said central portions parallel thereto, at least the outer extremities of said blade portions being disposed in said medial plane, and said cutter sets being located along said outer extremities of said blade portions.

16. An adjustable dado cutting tool comprising:

a pair of generally circular wedge plates having a common central axis of rotation and confronting, axially presented, parallel faces disposed at a given acute angle relative to a plane normal to said rotation axis, a pair of similar rotary cutting blades having flat central portions disposed in side by side relation between said wedge plates, the central portion of one blade slidably seating against said face of one wedge plate and said central portion of the other blade slidably seating against said face of the other wedge plate, each wedge plate having a circular journal shoulder projecting from its respective face in coaxial relation to an adjustment axis normal to the respective face, said central portion of each blade having a journal bore therethrough on an axis normal to the respective central portion and rotatably receiving said journal shoulder of the adjacent wedge plate, said adjustment axes intersecting the planes of their respective wedge plate faces at diametrically opposite sides of and in close proximity to said rotation axis, each blade further including a substantially flat blade portion extending generally radially from said central portion of the respective blade and terminating at its outer extremity in a set of circumferentially spaced cutters, said blades being oriented with said blade portions diametrically opposite one another, said cutter sets having a common medial plane inclined at said given acute angle relative to a plane passing between and parallel to said flat central portions of said blades, and said latter plane intersecting said medial plane along a line of intersection normal to said rotation axis, whereby said cutting blades are rotatably adjustable relative to said wedge plates between a minimum cutting width position wherein said medial plane is approximately normal to said rotation axis and a maximum cutting width position wherein said medial plane is inclined to said rotation axis, means interconnecting said blades for rotation of the latter in unison between said positions, means acting between said wedge plates for retaining the latter in a relative angular position wherein said wedge plate faces are parallel to one another, means acting between said wedge plates for clamping the latter together, thereby to secure said blades to said wedge plates for rotation of said wedge plates and blades in unison about said rotation axis to cut a dado, each said cutter set including a leading cutter with a radial cutting edge approximately parallel to said medial plane for cutting a side wall of the dado and a lateral cutting edge extending transverse to said medial plane for cutting the bottom wall of the dado, each said cutter set further including a number of cutters following the respective leading cutter and each having a lateral cutting edge extending transverse to said medial plane for cutting the bottom wall of the dado, one entire cutter set being located at one side of said line of intersection and the other entire cutter set being located at the opposite side of said line of intersection, said leading cutter of each cutter set being located at one side of an axial plane normal to said line of intersection and containing said rotation axis and the trailing cutter of each cutter set being located at the opposite side of said axial plane, the angle in said medial plane between said axial plane and said leading cutter of each cutter set being less than the angle in said medial plane between said axial plane and the trailing cutter of each cutter set, each cutter set subtending an arc substantially less than 135 degrees, and said axial plane being substantially parallel to both said rotation axis and said adjustment axes when said blades occupy said minimum cutting width position, and said axial plane rotating through an angle less than 180 degrees during rotation of said blades from said minimum cutting width position to said maximum cutting width position.

17. An adjustable tongue and dado cutting tool comprising:

a rotary supporting member having a central axis of rotation, rotary cutter means including two generally diametrically opposed sets of circumferentially spaced cutters having a common medial plane, cooperating means on said supporting member and said cutter means rotatably mounting said cutter means on said supporting member for angular adjustment of said cutter means relative to said supporting member in such manner that each said cutter set undergoes rotational motion about an adjustment axis inclined at a given acute angle relative to said rotation axis and inclined at the approximate complement of said given angle relative to said medial plane, means for securing said cutter means to said supporting member for rotation of said supporting member and cutter means about said rotation axis in unison, said medial plane intersecting said adjustment axis at a point, and a plane normal to said adjustment axis at said point intersecting said medial plane along a line of intersection approximately normal to said rotation axis, each said cutter set including a leading cutter and a trailing cutter each with a side cutting edge and a lateral cutting edge, said side cutting edges on the leading and trailing cutters of each cutter set being located at opposite sides of said cutter means, each said cutter set further including a number of intervening cutters each having a lateral cutting edge extending transverse to said medial plane, one entire cutter set being located at one side of said line of intersection and the other entire cutter set being located at the opposite side of said line of intersection, and said leading cutter of each cutter set being located at one side of an axial plane normal to said line of intersection and containing said rotation axis and the trailing cutter of each cutter set being located at the opposite side of said axial plane.

18. An adjustable cutting tool according to claim 17 wherein:

the side face of each trailing cutter adjacent its respective side cutting edge is relieved behind said edge to provide each trailing cutter with a positive clearance angle relative to the direction of rotation of the respective trailing cutter.

19. An adjustable cutting tool according to claim 17 wherein:

each trailing cutter is twisted in such manner that the side face of each trailing cutter adjacent its respective side cutting edge is relieved behind said edge to provide each trailing cutter with a positive clearance angle relative to the direction of rotation of the respective trailing cutter.

20. An adjustable tongue cutting tool comprising:

a rotary supporting member having a central axis of rotation, rotary cutter means including two generally diametrically opposed sets of circumferentially spaced cutters having a common medial plane, cooperating means on said supporting member and said cutter means rotatably mounting said cutter means on said supporting member for angular adjustment of said cutter means relative to said supporting member in such manner that each said cutter set undergoes rotational motion about an adjustment axis inclined at a given acute angle relative to said rotation axis and inclined at the approximate complement of said given angle relative to said medial plane, means for securing said cutter means to said supporting member for rotation of said supporting member and cutter means about said rotation axis in unison, said medial plane intersecting said adjustment axis at a point, and a plane normal to said adjustment axis at said point intersecting said medial plane along a line of intersection approximately normal to said rotation axis, each said cutter set including a trailing cutter with a side cutting edge and a lateral cutting edge, each said cutter set further including at least one additional cutter ahead of the respective trailing cutter having a lateral cutting edge, and one entire cutter set being located at one side of said line of intersection and the other entire cutter set being located at the opposite side of said line of intersection.

No references cited.

DONALD R. SCHRAN, *Primary Examiner.*